US006776261B2

(12) United States Patent
Eriksen et al.

(10) Patent No.: US 6,776,261 B2
(45) Date of Patent: Aug. 17, 2004

(54) LUBRICANT MONITORING SYSTEM

(75) Inventors: Odd Harald Steen Eriksen, Minneapolis, MN (US); Charles Robin Hood, Bullard, TX (US); Jon A. Cox, Victor, NY (US); Mark Jefferson Kranz, Longview, TX (US)

(73) Assignees: Garlock Sealing Technologies LLC, Palmyra, NY (US); Stemco LLC, Longview, TX (US); Rosemount Aerospace, Inc., Burnsville, MN (US)

( * ) Notice: Subject to any disclaimer, the term of this patent is extended or adjusted under 35 U.S.C. 154(b) by 36 days.

(21) Appl. No.: 10/157,566

(22) Filed: May 29, 2002

(65) Prior Publication Data

US 2003/0221911 A1 Dec. 4, 2003

(51) Int. Cl.$^7$ ................................................ F01M 1/18
(52) U.S. Cl. ........................ 184/6.4; 324/636; 73/61.42
(58) Field of Search ........................... 184/6.4; 324/636, 324/553, 638, 637, 639; 340/631; 73/61.42

(56) References Cited

U.S. PATENT DOCUMENTS

| | | | |
|---|---|---|---|
| 4,952,908 A | | 8/1990 | Sanner |
| 4,964,679 A | | 10/1990 | Rath |
| 5,032,821 A | | 7/1991 | Domanico et al. |
| 5,200,697 A | | 4/1993 | Adler et al. |
| 5,328,275 A | | 7/1994 | Winn et al. |
| 5,381,090 A | | 1/1995 | Adler et al. |
| 5,458,404 A | | 10/1995 | Fennel et al. |
| 5,488,871 A | | 2/1996 | Harbottle et al. |
| 5,658,053 A | * | 8/1997 | Vencill et al. ........... 301/105.1 |
| 5,667,313 A | | 9/1997 | Kapaan et al. |
| 5,754,055 A | * | 5/1998 | McAdoo et al. |
| 5,786,751 A | * | 7/1998 | Robby ........................ 340/438 |
| 5,791,441 A | | 8/1998 | Matos et al. |
| 5,810,485 A | * | 9/1998 | Dublin et al. ............... 384/626 |
| 5,904,427 A | | 5/1999 | Braun et al. |
| 5,959,365 A | | 9/1999 | Mantini et al. |

(List continued on next page.)

FOREIGN PATENT DOCUMENTS

WO     WO 98/11356     3/1998

OTHER PUBLICATIONS

Kauffman, R. E., et al., "Coke Formation from Aircraft Engine Oils: Part II–Effects of Oil Formulation and Surface Composition", Tribology Transactions, 43:677–680 (2000).
Kauffman, R.E., et al., "Rapid, Portable Voltammetric Techniques for Performing Antioxidant, Total Acid Number (TAN) and Total Base Number (TBN) Measurements", Lubr. Eng., pp. 39–46, Jan. 1998.
Kauffman, R.E., "On–Line and Off–Line Techniques for Monitoring the Thermal and Oxidative Degradations of Aircraft Turbine Engine Oils–Part 1: Laboratory Evaluations", Lubr. Eng. 51:914–921 (1995).
Univ. of Dayton Research inst., "Assessment of Remaining Lubricant Life", (US Dept. of Commerce Nat'l Technical Info. Serv., Nov. 1986).
International Search Report mailed Sep. 10, 2003 corresponding to PCT/US 03/16826.

Primary Examiner—David Fenstermacher
(74) Attorney, Agent, or Firm—John M. Harrington; Kilpatrick Stockton LLP (57) ABSTRACT

An apparatus is disclosed for monitoring characteristics of a fluid lubricant contained within a lubricant chamber formed in a wheel hub mounted for rotation about a stationary wheel axle. The apparatus includes an annular bearing spacer configured for mounting on the wheel axle between axially opposed inboard and outboard bearings, the annular bearing spacer forming an interior lubricant reservoir between an inner surface of the spacer and the wheel axle, a guide vane for directing lubricant from the lubricant chamber to the interior lubricant reservoir during rotation of the wheel hub assembly about the wheel axle, and a sensor operatively associated with the interior lubricant reservoir for determining a condition of the lubricant.

28 Claims, 7 Drawing Sheets

U.S. PATENT DOCUMENTS

| | | | |
|---|---|---|---|
| 6,200,037 B1 | 3/2001 | Braun | |
| 6,203,114 B1 * | 3/2001 | Ehrlich | 301/124.1 |
| 6,324,899 B1 | 12/2001 | Discenzo | |
| 6,538,426 B1 * | 3/2003 | Enrietto et al. | 324/174 |
| 2002/0051593 A1 * | 5/2002 | Oka | 384/448 |
| 2002/0070520 A1 * | 6/2002 | Osborn et al. | 280/93.512 |
| 2002/0181817 A1 * | 12/2002 | Novak et al. | 384/477 |
| 2003/0011358 A1 * | 1/2003 | Karpinski | 324/173 |
| 2003/0063827 A1 * | 4/2003 | Webb et al. | 384/544 |
| 2003/0071515 A1 * | 4/2003 | Elkow | 301/36.1 |
| 2003/0094849 A1 * | 5/2003 | Joki et al. | 301/105.1 |

* cited by examiner

LUBRICANT MONITORING SYSTEM

BACKGROUND OF THE INVENTION

1. Field of the Invention

The subject invention relates to a unitized wheel hub and bearing assembly for the wheel end of a vehicle axle, and more particularly, to a lubricant condition monitoring system disposed within the wheel hub of a heavy-duty truck or trailer.

2. Background of the Related Art

The safe operation of heavy highway transport vehicles such as trailers and trucks has become a high priority to operators and regulatory authorities with an increase in the number of accidents and resulting fatalities to vehicle operators and motorists caused by the detachment of the wheel hub assemblies from vehicle axles. This catastrophic event most often results from the failure of a wheel bearing or associated component due to excessive wear or overheating caused by a loss in lubricant integrity.

The longevity and safe operation of a wheel hub assembly and associated bearings is highly dependent on the integrity of the lubricant contained within the wheel hub. As additives in the lubricant are depleted, or the base stock of lubricant degrades due to moisture or extreme heat, the lubricant is less effective in protecting the axle and wheel hub assembly components from damage caused by friction between moving parts. Lubricant degradation is especially problematic for heavy highway transport vehicles, which typically travel for long durations and great distances with heavy loads. These conditions are likely to accelerate the deterioration of the lubricant within the wheel hub assembly.

Most motorists routinely inspect and perform regular maintenance on their vehicles. Indeed, drivers of heavy highway transport vehicles must also submit to inspections by regulatory authorities in which the sole aim is to identify vehicles that are not being properly maintained. However, the construction of the wheel hub assembly of a truck or trailer does not permit easy access for interior inspection. This poses a significant safety problem because the lubricant within the wheel hub assembly may be insufficient or severely degraded to the point at which an equipment failure may soon occur, even though the vehicle appears properly maintained. Because the condition of the lubricant within the wheel hub is undetectable by an inspector or the vehicle operator, an accurate assessment of the health of the wheel hub assembly cannot be adequately obtained.

Therefore, there is a need for a system that is adapted and configured to monitor the condition of the lubricant within a wheel hub assembly of a vehicle so as to enable the detection of potential problems that may cause failure of or damage to the components of the wheel hub assembly.

SUMMARY OF THE INVENTION

The subject invention is directed to a new and useful apparatus for monitoring the condition of a fluid lubricant contained within the lubricant chamber of a wheel hub mounted for rotation about a stationary wheel axle of a vehicle, such as, for example, a heady duty truck or trailer. The apparatus includes an annular bearing spacer configured to be mounted on the wheel axle between the axially opposed inboard and outboard bearings which support the wheel hub for rotation about the wheel axle. The annular bearing spacer forms an interior lubricant reservoir between an inner surface thereof and the wheel axle.

A guide vane is provided for directing lubricant from the lubricant chamber to the interior lubricant reservoir during rotation of the wheel hub assembly about the wheel axle, and sensing means are operatively associated with the interior lubricant reservoir for determining the condition of the lubricant directed into the interior reservoir by the guide vane. In addition, means are operatively associated with sensor for communicating a signal corresponding to a determined condition of the lubricant to a remote location or data retrieval device.

The annular bearing spacer has at least one inlet port formed therein to facilitate the ingress of lubricant into the interior reservoir from the guide vane, and at least one outlet port is formed therein to facilitate the egress of lubricant from the interior reservoir. Preferably, filtering means are operatively associated with the at least one outlet port to filter the lubricant that egresses from the interior reservoir into to the lubricant chamber.

The guide vane extends radially outwardly from an outer surface of the annular bearing spacer and is configured to direct lubricant from the lubricant chamber to the interior lubricant reservoir upon rotation of the wheel hub about the wheel axle. The guide vane includes fluid passages for receiving lubricant from the lubricant chamber as the wheel hub rotates about the wheel axle and for directing the lubricant radially inwardly toward the interior lubricant chamber. In addition, the guide vane includes axial discharge ports in communication with the fluid passages for directing lubricant in an axial direction toward the inboard and outboard bearings as the wheel hub rotates about the wheel axle.

In accordance with one aspect of the subject invention, the sensing means is adapted and configured to sense the presence of metallic and non-metallic particles in the lubricant, providing an indication of the state of the wheel hub in general and the bearings in particular. In accordance with another aspect of the subject invention, the sensing means is adapted and configured to sense the conductivity of the lubricant, providing an indication of the integrity of the lubricant. It is envisioned and well within the scope of the subject disclosure that the sensing means may be adapted and configured to sense other lubricant conditions such as, for example, antioxidant depletion, temperature or lubricant viscosity. In accordance with the subject disclosure, the measured lubricant conditions may be used to determine the lubricant integrity by obtaining values such as the remaining useful life of the lubricant.

The subject invention is also directed to a method of monitoring the condition of a fluid lubricant contained within the lubricant chamber of a wheel hub of a vehicle. The method includes the steps positioning a lubricant condition sensor within the lubricant chamber of a wheel hub, determining a condition of the lubricant within the lubricant chamber of the wheel hub, and communicating a signal relating to the condition of the lubricant within the lubricant chamber of the wheel hub. The step of determining the condition of the lubricant includes, among other things, sensing the presence of metallic particles in the lubricant, or sensing the conductivity of the lubricant.

These and other unique features of the in-hub lubricant condition monitoring system of the subject invention will become more readily apparent from the following description of the drawings taken in conjunction with the detailed description of the preferred embodiments.

BRIEF DESCRIPTION OF THE DRAWINGS

So that those having ordinary skill in the art to which the subject invention appertains will more readily understand how to make and use the lubricant condition monitoring system of the subject invention, preferred embodiments of the invention will be described in detail hereinbelow with respect o the drawings wherein.

These and other features of the in-hub lubricant condition monitoring system of the subject invention and the sensors utilized therewith will become more readily apparent to those having ordinary skill in the art form the following detailed description.

DETAILED DESCRIPTION OF THE PREFERRED EMBODIMENTS

Figure 1:
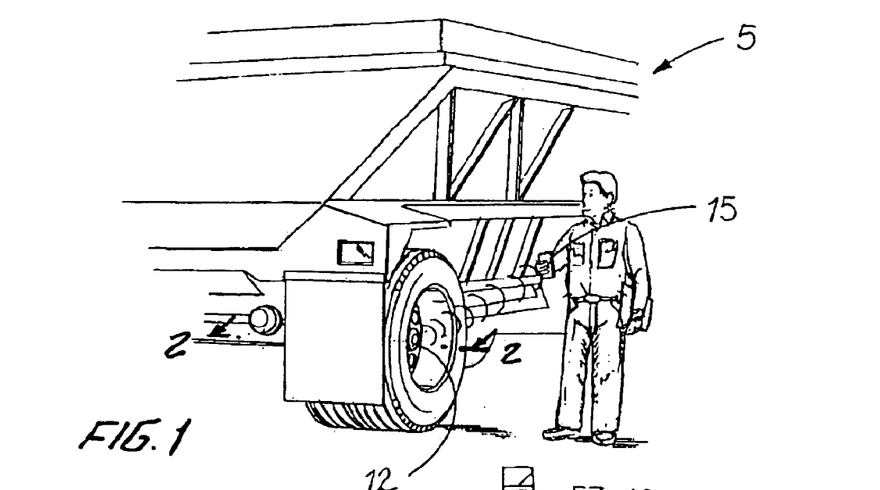
FIG. 1 is an illustration of the rear end of a heavy duty truck wherein the wheel hub contains a lubricant condition monitoring system constructed in accordance with the subject invention which is adapted to detect a condition and communicate a signal relating to the condition to a remote receiver, such as a hand-held computing device.

Referring now to the drawings wherein like numerals identify similar structural elements throughout the several views, there is illustrated in FIG. 1 the rear end of a heavy duty truck or trailer 5, the wheel end of which includes a wheel hub and bearing assembly 12 containing the lubricant conditioning monitoring system of the subject invention. A system constructed in accordance with the present disclosure may also be advantageously incorporated with a unitized wheel hub and bearing assembly, such as the type disclosed in commonly assigned U.S. Pat. No. 5,328,275, the disclosure of which is incorporated by reference herein in its entirety.

The lubricant monitoring system of the subject invention is adapted to monitor and determine the condition of the lubricant within the wheel hub assembly. This may be accomplished by measuring certain condition parameters which yield information about the lubricant condition. The condition parameter of the lubricant being monitored can vary depending upon the type or nature of sensor employed. For example, the monitored condition parameter could be the conductivity of the lubricant. Variations in the conductivity may be used to determine the acidity or total acid number (TAN), total base number (TBN), level of antioxidants, viscosity, or other like parameters which are indicative of the level of oxidation, lubricant integrity and remaining useful life (typically expressed as "percent remaining useful life" or "% RUL") of the lubricant. Another example of condition parameter which may be monitored in accordance with the present disclosure relates to the presence of metallic or non-metallic particles in the lubricant. A greater presence of metallic particles in the lubricant could be indicative of a loss in bearing integrity. The system is further configured to communicate a signal, such as a radio frequency signal, to an external data retrieval device, such as a hand-held computing device 15, to indicate the condition or health of the lubricant within the wheel hub of the vehicle. In so doing, an observer such as a vehicle operator or inspector can easily determine the state of the wheel hub assembly. The term communication, as used herein, generally relates to a transfer of data and may include transmission or reflection of a signal.

It is envisioned that the signal communicated by the lubricant condition sensor may be broadcast to a remote location, such as a central monitoring station, by means of satellite transmission or the like. Alternatively, the signal may be communicated to the passenger compartment of the vehicle to provide the driver with information concerning the condition of the lubricant within the wheel end of the vehicle. This information could be in the form of a visual or audible alarm signal which would warn the driver of a dangerous condition such as an imminent bearing failure, advising the driver to pull over to the side of the road so as not to risk an accident.

Figure 2:
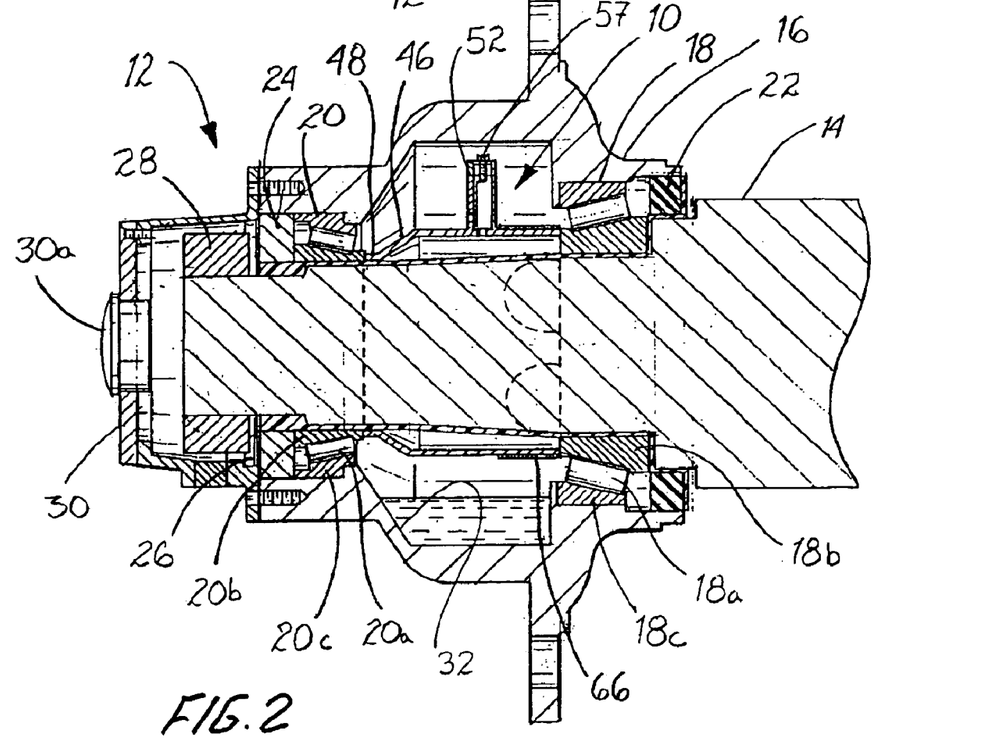
FIG. 2 is a cross-sectional view of the wheel end taken along line 2—2 of FIG. 1 illustrating an exemplary wheel hub and bearing assembly which incorporates a bearing spacer that defines an interior lubricant reservoir and supports the lubricant monitoring system of the subject invention.

Referring to FIG. 2, the lubricant monitoring system of the subject invention, which is designated generally by reference numeral 10, is located within a wheel hub and bearing assembly 12 mounted on a stationary axle 14 of a heavy duty vehicle 5. The wheel hub and bearing assembly may or may not be unitized. It should be understood by those skilled in the art that the lubricant monitoring system of the subject invention and the structural components associated therewith can be employed in wheel hub configurations which differ from that which is illustrated and described herein.

Referring to FIG. 2, wheel hub assembly 12 generally consists of a wheel hub 16 supported for rotation on the end of a stationary vehicle axle 14 by axially opposed inboard and outboard roller bearing sets 18 and 20. Bearing sets 18 and 20 are bounded by inboard and outboard shaft seals 22 and 24, respectively. Inboard bearing set 18 includes a plurality of caged rollers 18a mounted between radially inner and outer races 18b and 18c, while outboard bearing set 20 includes a plurality of caged rollers 20a mounted between radially inner and outer races 20b and 20c.

A mounting sleeve 26 and a threaded spindle nut 28 secure the components of the hub assembly 12 to the vehicle axle 14. A hubcap 30 having a removable fill plug 30a is mounted at the outboard end of wheel hub 16 to protect the components of the hub assembly 12 from road debris, dust, rain and any other potential contaminants which may shorten the life of the wheel bearings. A particularly useful hubcap is disclosed in commonly assigned U.S. Pat. No. 5,752,746. Wheel hub 16 also defines a sealed lubricant chamber 32 filled with a suitable bearing lubricant, such as grease or oil. The lubricant contained within the chamber serves to bathe the roller bearing sets 18 and 20 so as to limit and reduce bearing wear caused by friction and the influence of abrasive contaminants in the lubricant during vehicle operation. Lubricant may be added to the wheel hub assembly 12 via a fill plug (not shown) located between bearing sets 18 and 20. In other wheel hub assemblies currently in use, particularly those without an outboard shaft seal 24, lubricant may be added through a side fill plug or fill plug 30a in hubcap 30 is adapted to provide a location for adding lubricant.

Figures 3, 4, 5:
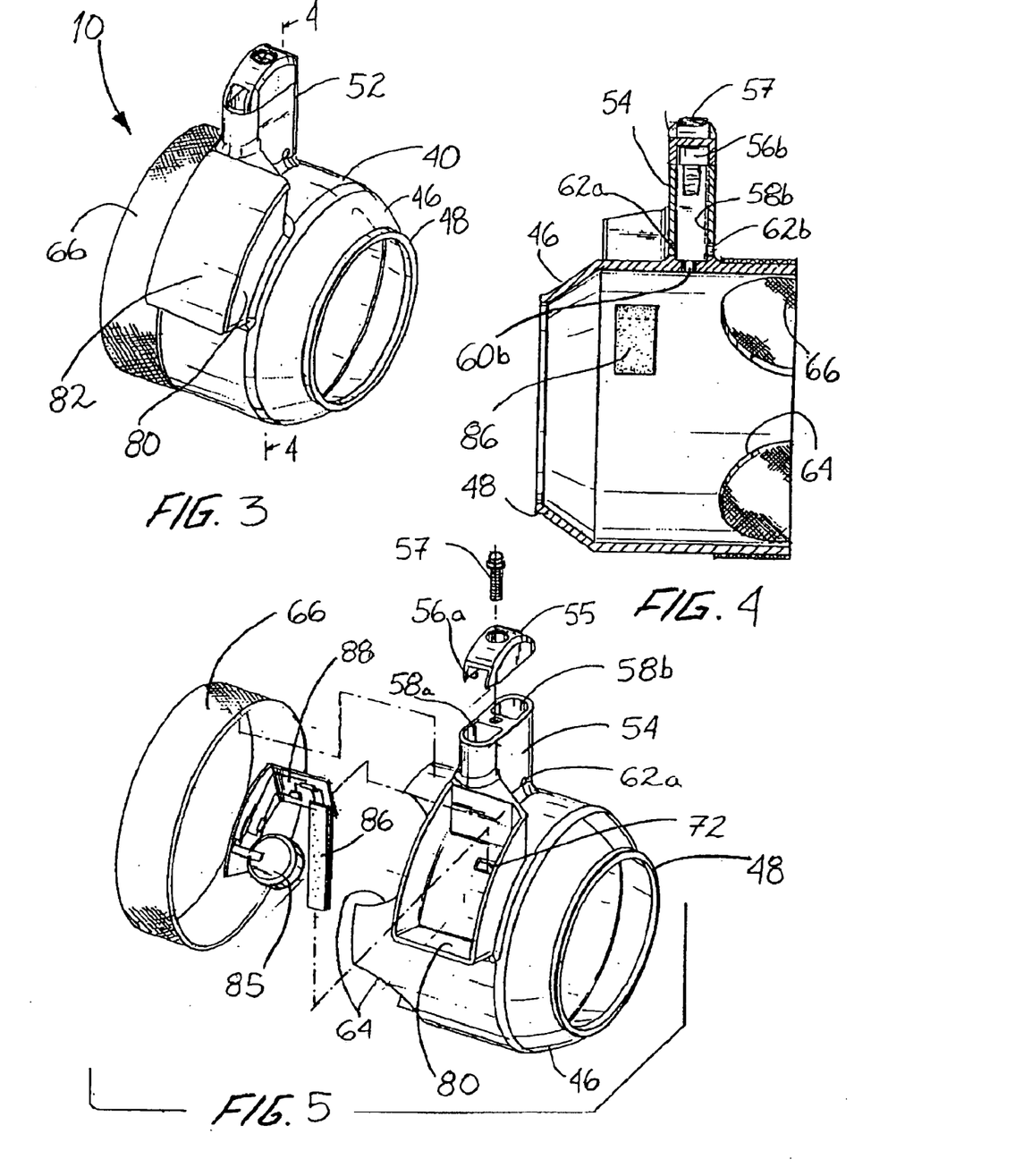
FIG. 3 is a perspective view of the bearing spacer of the subject invention which is shown in FIG. 2.
FIG. 4 is a side elevational view in cross-section of the bearing spacer of FIG. 3.
FIG. 5 is an exploded perspective view of the bearing spacer of FIG. 3 with parts separated for ease of illustration.

With continuing reference to FIG. 2 in conjunction with FIGS. 3 through 5, an annular bearing spacer 40 is disposed within lubricant chamber 32 and surrounds the vehicle axle 14 between the inboard and outboard bearings 18 and 20. The outboard end of bearing spacer 40 defines a frusto-conical section 46 which terminates in an annular rim 48. Annular rim 48 abuts the radially inner race 20b of the outboard bearing 20. The inboard end of spacer 40 abuts the radially inner race 18b of the inner board bearing 18. An interior lubricant reservoir 50 is formed between the inner wall of spacer 40 and the portion of the vehicle axle 14 that is surrounded thereby. The interior reservoir defines the area in which the condition of the lubricant within wheel hub 16 is monitored.

A lubricant guide vane 52 extends radially outwardly from the outer surface of bearing spacer 40 into the lubricant chamber 32 of wheel hub 16. Guide vanes of this type are disclosed in commonly assigned U.S. Pat. Nos. 5,904,427 and 6,200,037, the disclosures of which are herein incorporated by reference in their entireties. As best seen in FIG. 5, guide vane 52 is defined by a vane body 54 having an end cap 55 that is secured to the vane body by a threaded fastener 57. Alternatively, end cap 55 may be molded together with vane body 54, or secured by any other suitable fastening device, such as for example, a snap-fit engagement. The vane body may be welded to or molded integrally with bearing spacer 40, or secured thereto in another conventional manner. End cap 55 forms opposed lateral inlet ports 56a and 56b which receive lubricant from chamber 32 while wheel hub 16 rotates in a forward or reverse direction during vehicle operation. When the vehicle is at rest, lubricant does not flow into the lateral inlet ports 56a, 56b of end cap 55. Radial passages 58a and 58b formed in vane body 54 communicate with the lateral inlet ports 56a and 56b, respectively, to direct lubricant from chamber 32 into lubricant reservoir 50. More particularly, radial passages 58a and 58b communicate with corresponding radial inlet ports 60a and 60b, respectively which extend radially through the wall of bearing spacer 40, opening into reservoir 50.

As discussed in more detail hereinbelow with reference to FIG. 6, during vehicle operation the lubricant within chamber 32 travels through the passages of the guide vane as a result of the velocity pressure generated by the rotational movement of the lubricant annulus developed within the lubricant chamber as the wheel hub 16 rotates about the vehicle axle 14. As described for example in U.S. Pat. Nos. 5,904,427 and 6,200,037, guide vane 52 can also include axial outlet ports 62a, 62b on either or both the inboard and outboard sides of vane body 54 for redirecting lubricant in the general direction of bearings 18 and 20 so as to redistribute the lubricant from the lubricant annulus to the outlying bearings.

As best seen in FIG. 4, a plurality of circumferentially spaced apart arcuate apertures 64 are formed at the inboard end of bearing spacer 40. These apertures serve as the outlet ports for interior lubricant reservoir 50. More particularly, the apertures 64 provide for the transfer of lubricant between inner reservoir 50 and the surrounding sealed lubricant chamber 32 of wheel hub 16 in the vicinity of the inboard bearings 18. Consequently, the apertures 64 provide for the redirection of additional lubricant from the lubricant annulus to the area of the inboard bearing 18.

As best seen in FIG. 5, a filtration sleeve 66 is operatively associated with the inboard end of bearing spacer 40 for covering apertures 64 so that the lubricant transferring from the interior lubricant reservoir 50 to the main lubricant chamber 32 is free of particles larger than the pore size of the filter medium or impurities that may further degrade the lubricant and cause harm to the bearings. Preferably, filtration sleeve 66 is formed from a durable filtration media, such as, for example, a non-woven or woven filtration media formed from a polymeric material such as PTFE or Nylon. The retention characteristics and the type of the media will depend upon the operating environment and can be selected accordingly. It is envisioned that the filtration sleeve could be configured as a removable element of the bearing spacer that could be discarded and easily replaced during an overhaul service. It is further contemplated that the filtration sleeve can be made into a non-separable part of bearing spacer 40, via an insert molding process. In addition, the bearing spacer may be configured and adapted to perform filtration, such as for example, by incorporating movable slides over apertures 64, or alternatively, perforating an embodiment of the bearing spacer which does not include apertures 64. Furthermore, bearing spacer 40 may be fitted with a filter having embedded wiring adapted to sense the presence of metallic debris upon bridging adjacent wires.

Referring to FIGS. 3 through 5, bearing spacer 40 includes a sensor housing 80 which safely houses the plurality of electronic components which cooperate to monitor the condition of the lubricant within the wheel hub 16 and more particularly within the interior lubricant reservoir 50. Sensor housing 80 is preferably molded integrally with bearing spacer 40, or attached thereto in another conventional manner such as by welding, and provides a cavity in which to dispose the plurality of electronic components, thereby protecting them from the lubricant, among other things. In this embodiment, housing 80 has a cover 82 that is sealed on the housing through any conventional means, such as for example, via potting. Alternatively, cover 82 may be removable to enable access to the components housed therein and threaded fasteners or the like are provided to releasably secure the cover 82 to the housing 80.

The components provided within sensor housing 80 include a lubricant sensing probe 86 which will be discussed in greater detail below, a power cell 85 and a printed circuit board ("PCB") 88, all in electrical communication with one another. PCB 88 contains, among other things, a processor, such as a microprocessor or microcontroller, for storing and processing lubricant condition data obtained by sensing probe 86, as well as conventional signal conditioning circuitry such as amplifiers and buffers, and signal generation and communication devices, such as, for example a radio frequency ("RF") communicator. Those skilled in the art will readily appreciate that the design of the circuit board can vary depending upon the type of sensor employed in the system and the manner by which data is processed and communicated without departing from the spirit or scope of the subject disclosure. As best seen in FIGS. 4 and 5, a slot 72 extends through the wall of bearing spacer 40 to permit the extension of sensor probe 86 into the interior lubricant reservoir 50 (see also FIG. 8).

Figure 6:
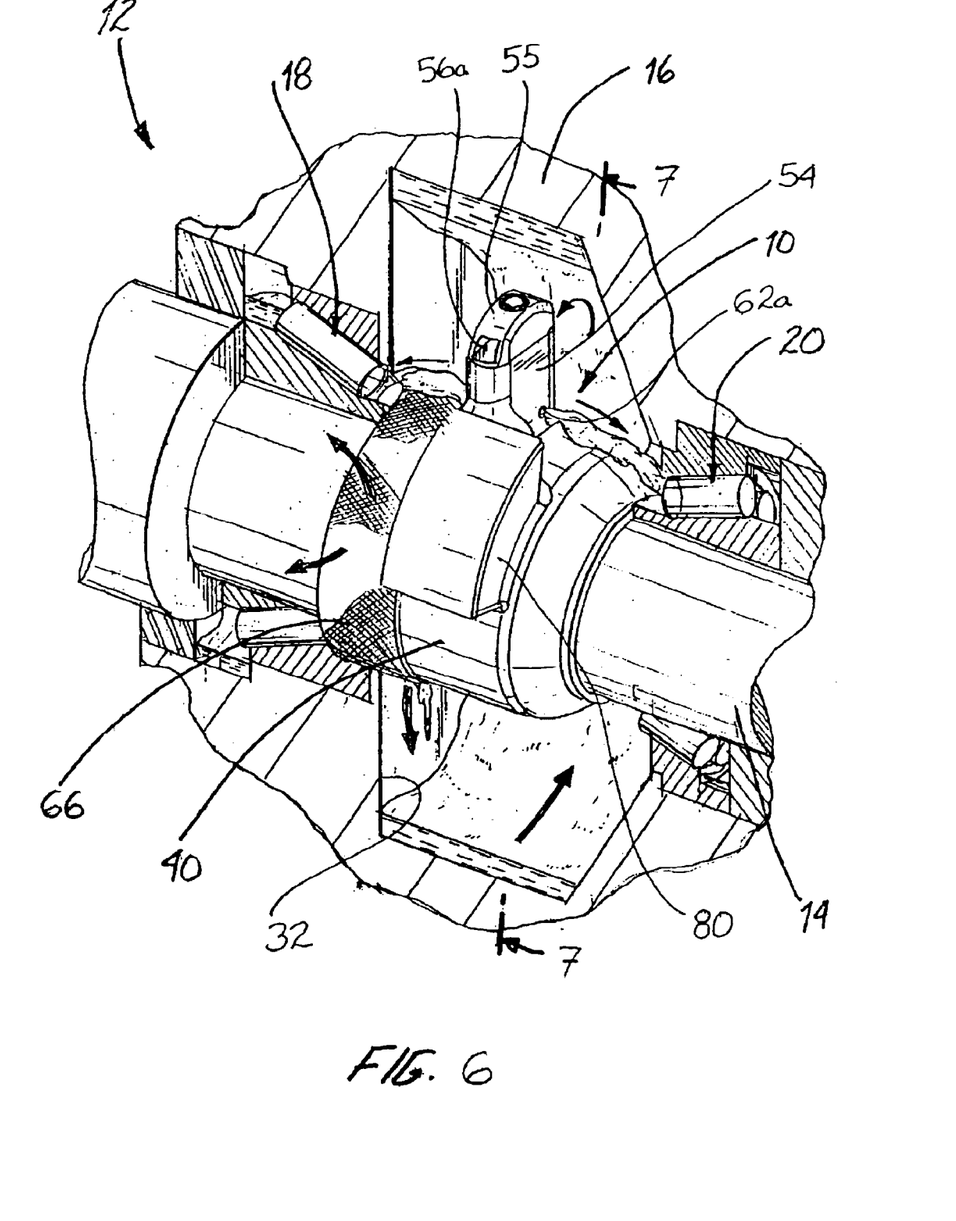
FIG. 6 is a perspective view of the wheel hub assembly of FIGS. 1 and 2 with the outer wall broken away to illustrate the flow of lubricant within the wheel hub assembly as the wheel hub rotates about the vehicle axle.
Figure 7:
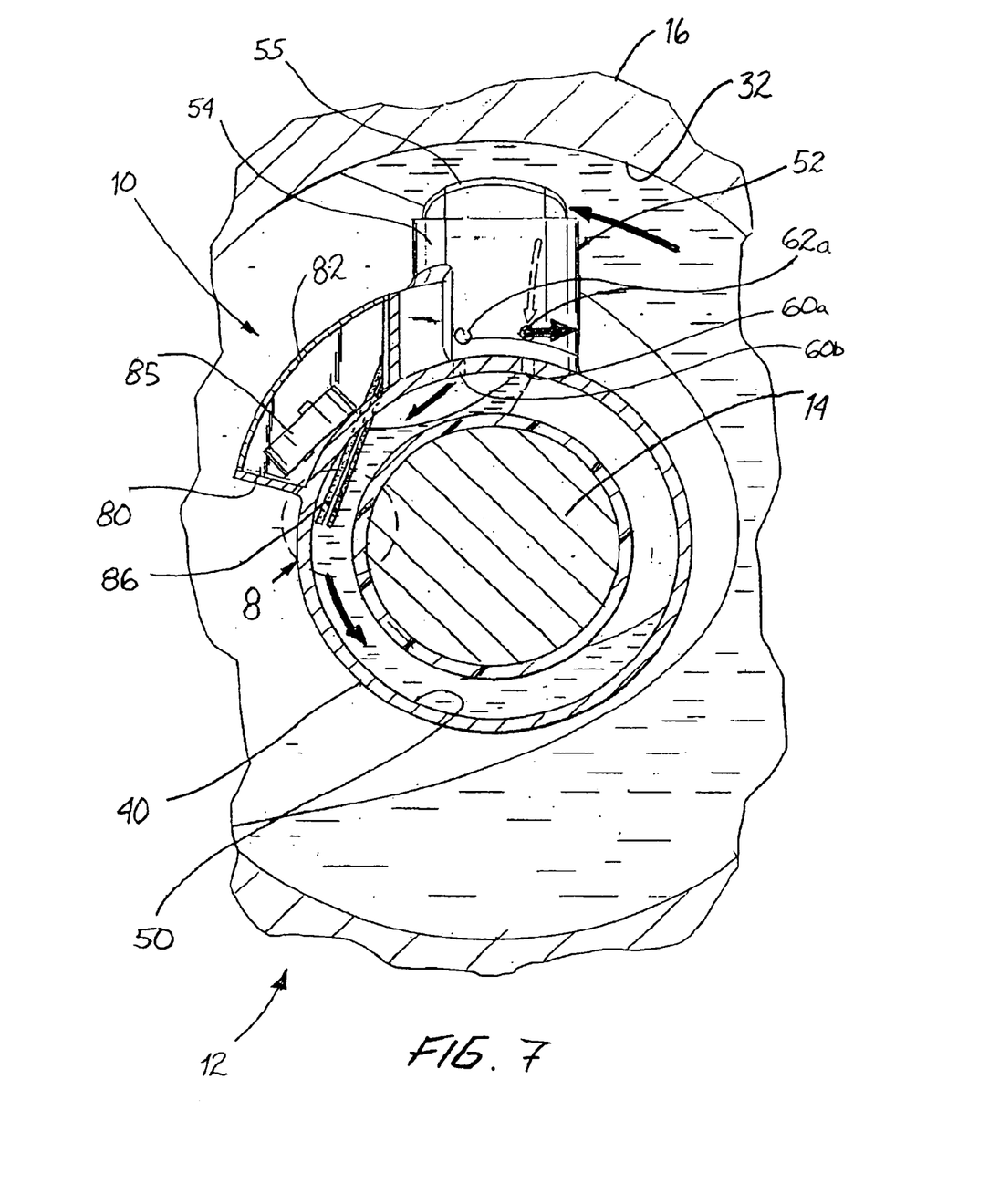
FIG. 7 is a cross-sectional view taken along line 7—7 of FIG. 6, illustrating the flow of lubricant within the wheel hub assembly and through the guide vane as the wheel hub rotates about the vehicle axle.

Referring to FIGS. 6 and 7, in operation, when the wheel hub 16 rotates about vehicle axle 14 supported by roller bearings 18 and 20, the lubricant contained within chamber 32 is subject to centrifugal forces, and accordingly, it is drawn radially outwardly against the interior wall of the lubricant chamber. As a result, an annulus of lubricant is formed within the chamber 32 which rotates within the wheel hub 16 and bathes the inboard and outboard bearings 18 and 20. Guide vane 52 is dimensioned and configured to project into the lubricant annulus. Thus, as the lubricant annulus rotates, generating velocity pressure, lubricant is directed into one of the lateral inlet ports 56a, 56b in end cap 55 depending upon the direction of the rotation of the hub, through a corresponding radial passage 58a, 58b and into the interior reservoir 50 through a corresponding radial inlet port 60.

Figures 8, 8A:
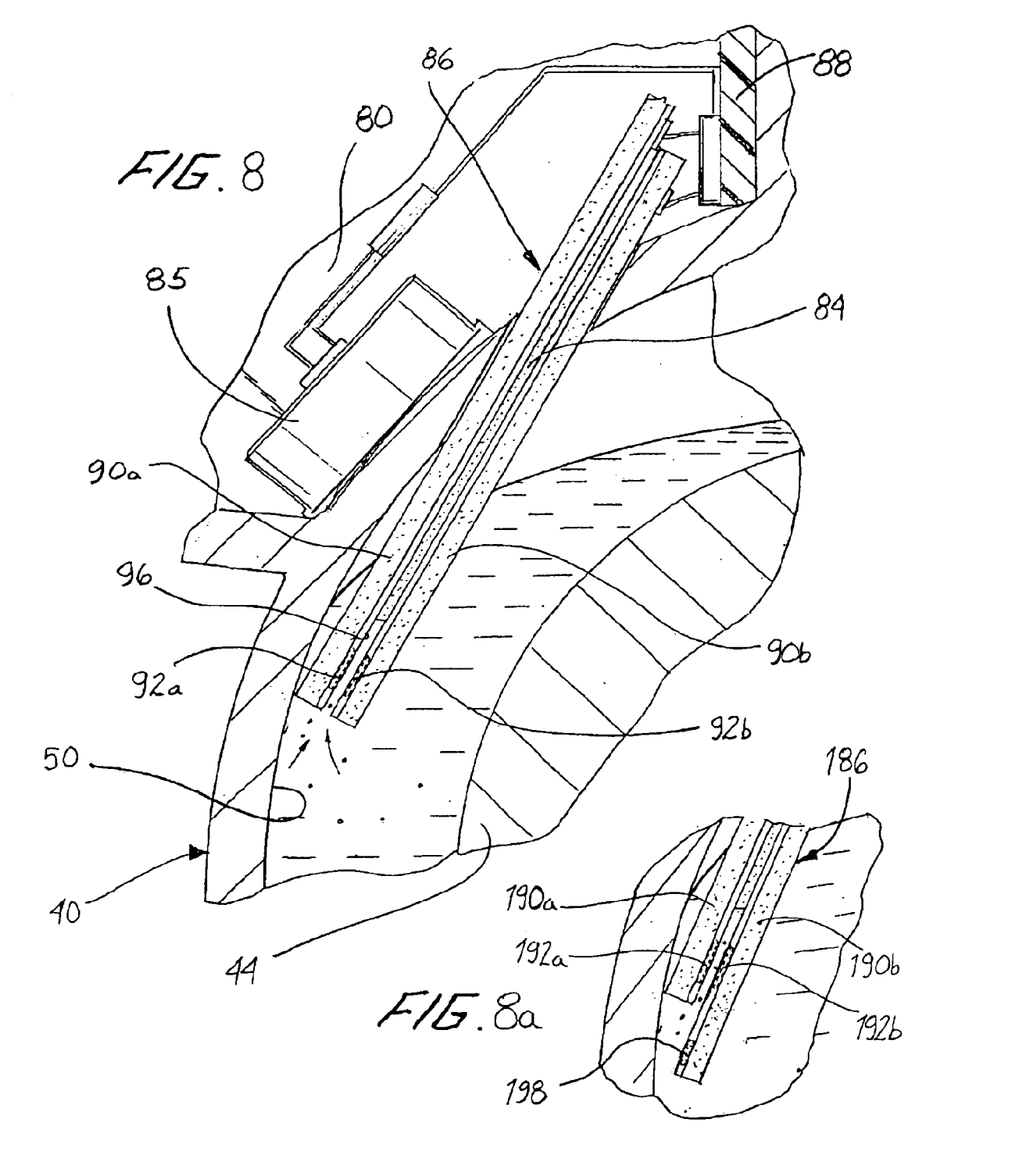
FIG. 8 is an enlarged detailed view of a sensing probe constructed in accordance with an embodiment of the subject invention which projects into the interior lubricant reservoir formed between the bearing spacer and the vehicle axle to monitor to sense the presence of metallic particles in the lubricant.
FIG. 8a is an enlarged detailed view of alternate embodiment of the sensing probe illustrated in FIG. 8 which incorporates plural sensors to monitor plural lubricant conditions.

Referring to FIG. 8, the condition of the lubricant directed into reservoir 50 from lubricant chamber 32 is continuously monitored by the sensing probe 86 housed in sensor housing 80. Monitoring is performed by way of an instruction set coded into the processor associated with PCB 88, and the instructions set preferably includes a feedback loop or subroutine which evaluates signals observed by the sensing probe 86. As discussed in more detail hereinbelow, sensing probe 86 is adapted and configured to determine the condition of the lubricant and/or % RUL. This may be accomplished by techniques such as measuring the conductivity of the lubricant to determine parameters such as the TAN, TBN, antioxidant level or any other parameters which can be used alone, or in combination with other parameters, to determine the condition of the lubricant and/or % RUL. Changes in the conductivity of the lubricant can result from circumstances such as variations in the acidity, amount of metallic and non-metallic particles or contaminants in the lubricant, which could be present due to the degradation or wear of the bearings or the component parts, water ingress, or from road debris. It should be recognized that when the lubricant egresses from the interior lubricant reservoir 50 through apertures 64 proximate to the inboard bearing 18, such contaminants or particles of debris are advantageously prohibited from returning to the main lubricant chamber 32 by the filtration sleeve 66.

In accordance with an embodiment of the subject invention, the lubricant monitoring system disclosed herein can employ micro-electro-mechanical-systems (MEMS) technology, and in particular, a MEMS based inductive particle detector with associated logic and electronics to determine the condition of the lubricant within the wheel hub of a vehicle. For example, referring to FIG. 8, sensing probe 86 includes a pair of spaced apart wafers 90a and 90b that are separated from another by a spacer 94. The spacer 94 may be a glass frit or a similar material, and it forms a channel 96 between the two sensors. The gap distance of channel 96 may vary depending upon the size and configuration of the sensing probe and the environment in which it is employed, and is controlled by the thickness of spacer 94.

Each wafer 90a, 90b of sensor probe 86 includes one or more sets of planar coils 92a, 92b which are formed from multiple superimposed layers of a metal and an insulating dielectric material such as a polymer film or silicon dioxide. Preferably, the metal is a highly conductive, non-corrosive metal, such as gold. Each metal layer is shaped into a spiral pattern by photolithograhic means or by etching, and is subsequently coated with a dielectric layer. A passage is provided through each dielectric layer to facilitate the connection of each succeeding metal revolution of the spiral. Each spiral carries current in the same rotational direction, thus emulating a wire wound coil of multiple layers.

The planar spiral coils 92a, 92b formed in each wafer 90a, 90b are disposed on the elongated facing surfaces of the wafers. This spatial arrangement results in an inductive coupling between the coils when the gap is filled with a dielectric material (i.e., oil) and one of the coils (hereinafter referred to as the "primary coil") is energized. The inductive coupling causes a current to be delivered to the opposed coil (hereinafter referred to as the "secondary coil"), across the channel 96 at a voltage that is proportional to the number of revolutions in the primary coil as compared with the number of revolutions in the secondary coil.

The presence of a material within the channel 96 between the opposed coils of wafers 90a, 90b has an effect on the voltage that is detected at the secondary coil. This effect is measured as the output voltage from the secondary coil. Thus, any foreign particles, such as wear debris, in the lubricant will influence the inductive coupling between the spaced apart coils 92a, 92b of wafers 90a, 90b, resulting in a measurable voltage change in the secondary coil. The presence of a magnetic material in the lubricant would be indicated by an increase in the voltage at the second coil, while the presence of a paramagnetic or diamagnetic material in the lubricant would be indicated by a decrease in the secondary output voltage.

In use, alternating current is provided to the primary coil of sensing probe 86, as discussed above, with a periodic waveform of a given magnitude through the use of an oscillator device associated with PCB 88 that is suitably buffered by an appropriate amplifier so that drift due to loading and vibration is not significant. The secondary coil functions as inductive pickup that is affected by the coupling medium or lubricant between the coils of the opposed wafers 90a, 90b.

When the coils 92a, 92b are separated by a non-conducting media, such as in the case of a clean lubricant, a waveform is received by the secondary coil that has a magnitude which corresponds substantially to the magnitude of the waveform provided at the-primary coil. If foreign particles of a conductive or magnetic nature develop in the lubricant as a result of bearing degradation, for example, and enter the flux field between the surface coils 92a, 92b of wafers 90a, 90b, the magnitude of the waveform received by the secondary coil would vary due to the altered coupling coefficient. This pickup waveform is then buffered by an appropriate amplifier to eliminate loading effects, filtered by a band-pass filter or a similar device and sampled for amplitude variations by an envelope/amplitude detector or a similar device associated with PCB 88.

Thereafter, the amplitude variations are characterized by the processor associated with PCB 88 that determines for example, the size, shape and density of the particles or contaminants in the lubricant based upon stored reference values. The processor then communicates this information periodically or upon request to a remote receiver to indicate the condition of the lubricant. If, for example, the measured values exceed certain threshold values, which would indicate the presence of a large quantity of a foreign matter indicative of a severe mechanical breakdown of a bearing, an alarm signal may be communicated to the vehicle operator or to a remote monitoring station by RF or a similar mode of communication.

As illustrated in FIG. 8a, there is illustrated another sensor probe 186 constructed in accordance with the subject invention wherein the particle detection sensor of FIG. 8 is combined with other sensors 198 such as, for example, a voltammetry sensor, a conductivity sensor or temperature sensor. More particularly, one or more additional sensors 198 are supported on one or both of the opposed wafers 190a, 190b at a location that is spaced from the particle detector coils 192a, 192b on the opposed facing surfaces of the wafers.

Figure 9:
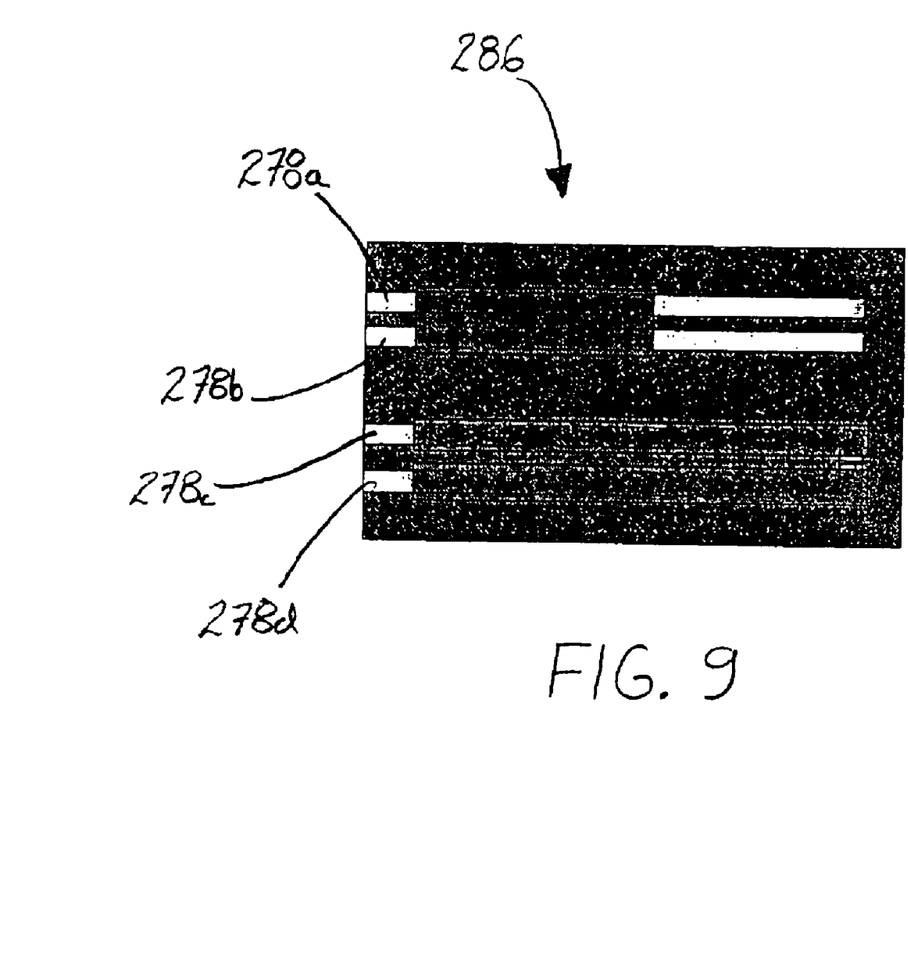
FIG. 9 is a top plan view of an embodiment of a lubricant condition sensing probe incorporating voltammetry and conductivity detectors for use with the lubricant monitoring system of the subject disclosure to determine the level of antioxidants in the lubricant.
Figure 10:
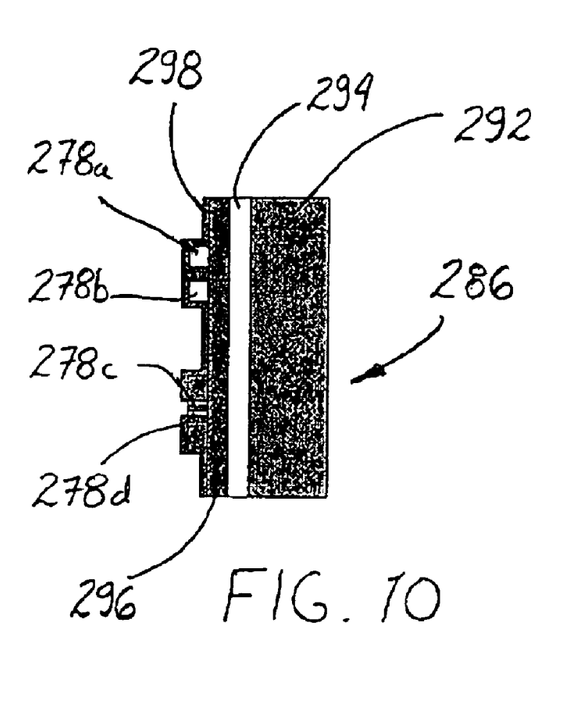
FIG. 10 is a side elevational view of the lubricant condition sensing probe illustrated in FIG. 10.

In accordance with another embodiment of the present disclosure, there is illustrated in FIGS. 9 and 10, another sensing probe 286 which incorporates both a conductivity sensor and a voltammetry sensor for in-hub lubricant condition monitoring. Sensing probe 286 uses an electrochemical reaction for measuring the quality or condition of the lubricant within the wheel hub of a vehicle. Preferably, the sensing probe 286 is packaged in such a manner so that the sensing portion of the probe protrudes from a housing which protects the electronics associated with the probe from the corrosive effects of the lubricant in the wheel hub assembly 12.

In use, a voltage is applied across two closely spaced electrode elements immersed in the lubricant. At a certain potential, fluid components, such as antioxidants in the lubricant, oxidize at the electrode surface. This generates a measurable current. The current level indicates the concentration of these components in the fluid. As the component is depleted, the signal changes. A correlation can be drawn between the level of antioxidant depletion, or any other condition parameters discussed herein, and the integrity of the lubricant. The relationships between these condition parameters and lubricant degradation can be determined so that % RUL plots can be established for different lubricant applications (i.e., such as type of vehicle or hub assembly, driving conditions, average trailer load, thermal conditions, etc.). In accordance with the subject disclosure, the lubricant monitoring system would communicate a signal to the vehicle operator or to a remote monitoring station or data retrieval device indicating the integrity of the lubricant and/or % RUL. It is also contemplated that the present system may communicate an alert upon detecting a condition parameter at a level which indicates that the lubricant within the wheel hub should be replaced. Preferably, an alert is communicated at the point prior to the critical level at which point the lubricant will degrade at an accelerated rate. The moment that large changes in the physical and/or chemical properties of the lubricant begin to occur is effectively the end of the lubricant's remaining useful life.

To fabricate the sensor probe 286, a silicon dioxide layer 294 is thermally grown on a silicon substrate 292. The growth of layer 294 is followed by a low-pressure chemical vapor deposition (LPCVD) silicon nitride layer 296. A layer of titanium coated with gold, forming electrodes 278a–278d, is disposed on layer 296, preferably configured as elongated strips of material. A passivating layer 298 consisting of plasma enhanced chemical vapor deposition (PECVD) silicon nitride is then disposed over layer 296, and most of the exposed electrodes 278a–278d. Certain portions of the electrodes are left exposed to create points of contact for communication with the lubricant. Alternatively, probe 286 may be fabricated using materials and production techniques commonly used to manufacture PCBs.

For optimal signal analysis, fluid conductivity must be factored out of the voltammetry output of sensor probe 286. Thus, conductivity is measured on electrodes 278a and 278b, while voltammetry is measured on electrodes 278c and 278d, which are necessarily small and relatively closely spaced for optimum performance. Those skilled in the art will readily appreciate that the ideal size and/or spacing of the voltammetry electrodes will vary depending upon the application and environment in which the sensor is employed. Once measured, the voltage drop across the conductivity sensing electrodes 278a, 278b is subtracted from the voltage drop across the voltammetry contacts 278c, 278d leaving only the electrochemical voltage represented by the following formula:

$$V = V_{oxidation} + IR$$

where IR is the voltage drop due to the conductivity of the lubricant and $V_{oxidation}$ is the electrochemical oxidation potential of the component of the lubricant under analysis. Upon determining the electrochemical voltage, the processor determines whether a stored threshold value of the voltage has been exceeded. Preferably, the voltage is monitored using a process control loop, and when a voltage indicative of an insufficient level of antioxidant is determined, a signal is communicated to the vehicle operator or to a remote monitoring station or data retrieval device to provide information relating to this sensed lubricant condition.

Figure 11:
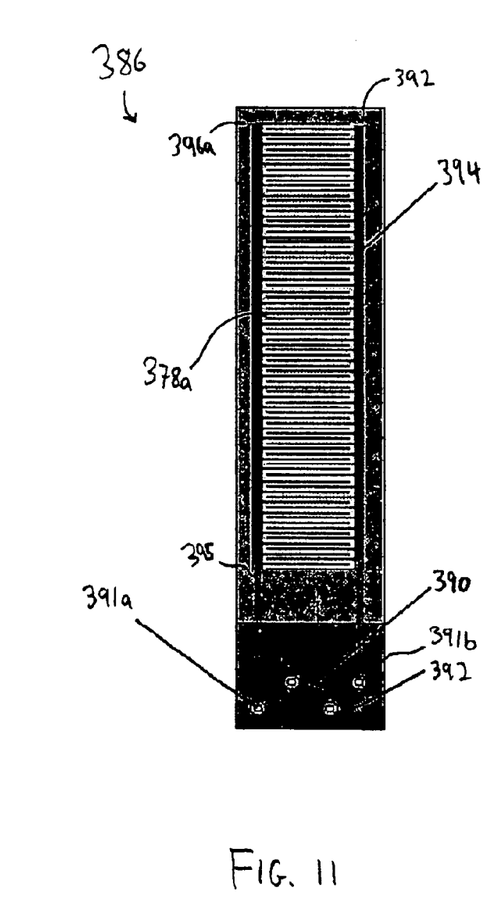
FIG. 11 is a top plan view of another embodiment of a lubricant condition sensing probe for use with the lubricant monitoring system of the subject disclosure illustrating a first sensing side.
Figure 12:
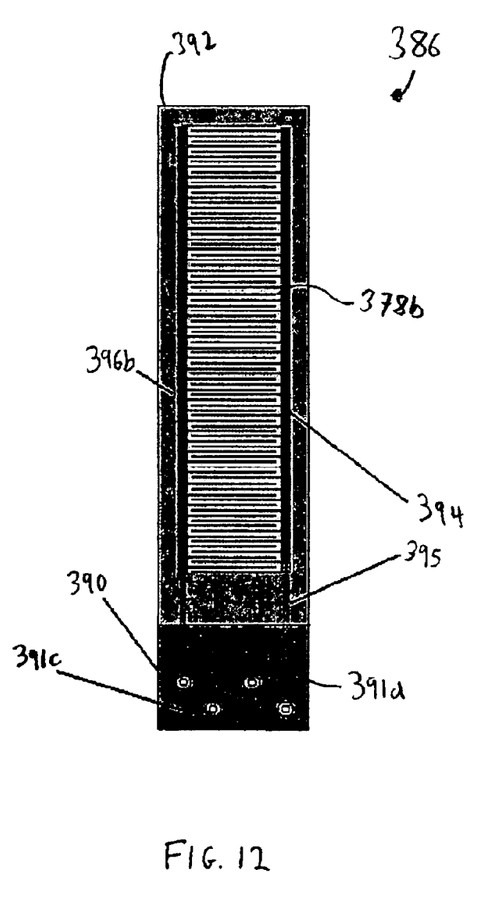
FIG. 12 is a top plan view of a second sensing side opposing the first sensing side in the embodiment of lubricant condition sensing probe depicted in FIG. 11.

In accordance with another embodiment of the present disclosure, there is illustrated in FIGS. 11 and 12, a sensing probe 386 for in-hub lubricant condition monitoring. Sensor probe 386 consists of a substrate 392 having electrodes 378a and 378b disposed on opposing sides 396a and 396b of the substrate 392.

Substrate 392 may be coated with any tough durable polymer, such as polyimide, and especially those which are heat-resistant. Electrodes 378a, 378b consist of an array of electrically conductive lines. Preferably, the lines are in a staggered arrangement, that is, configured in an interdigitated, sharply alternating or zigzagging manner as shown in FIGS. 11 and 12. This arrangement of lines in electrodes 378a, 378b provides a plurality of axial gaps between every two adjacent, alternating line segments along the longitudinal axis of substrate 392. Electrodes 378a, 378b are in electrical communication with electrically conductive side rails 394 disposed substantially longitudinally along sides 396a, 396b of substrate 392. Side rails 394 are in electrical communication with traces 395 that extend to a portion of substrate 392 which is protected within the housing in the wheel hub assembly 12 when probe 386 is installed. In this embodiment, a solder mask 390 provides further protection for contact points 391a, 391b, 391c, and 391d which are used to provide electrical communication between probe 386 and electronic components within the protective housing. As shown, contact points 391a and 391b are in communication with traces 395 associated with electrode 378a and contact points 391c and 391d are in communication with traces 395 associated with electrode 378b.

In this embodiment, the individual lines in electrode 378a are thinner than the lines in electrode 378b. The resulting electrode 378a has a greater amount of alternating line segments but less space between adjacent line segments then electrode 378b. This arrangement typically provides a greater range of detectable data, which may be advantageous in predicting lubricant failure, depending on the characteristics of the particular lubricant. Alternatively, both arrays may be substantially identical.

As in the previous embodiment, sensing probe 386 uses an electrochemical reaction to measure the quality or condition of the lubricant within the wheel hub of a vehicle. The sensing probe 386 is packaged in such a manner so that the sensing portion of the probe (i.e., the portion of substrate 392 having electrodes 378a, 378b) protrudes from a housing which protects the electronics associated with the probe from the corrosive effects of the lubricant in the wheel hub assembly 12.

In use, a voltage is applied to electrodes 378a, 378b while immersed in the lubricant. Lubricant flows through the gaps between adjacent alternating line segments and is exposed to the electricity. As discussed in the previous embodiment, at a certain potential, fluid components, such as antioxidants in the lubricant, oxidize at the electrode surface which generates a measurable current. The current level indicates the concentration of these components in the fluid. As the component is depleted, the signal changes. A correlation may be drawn between the level of antioxidant depletion, or any other condition parameters discussed herein, and the integrity of the lubricant. The relationships between these condition parameters and lubricant degradation can be determined so that % RUL plots can be established for different lubricant applications (i.e., such as type of vehicle or hub assembly, driving conditions, average trailer load, thermal conditions, etc.).

In accordance with the subject disclosure, the lubricant monitoring system would be adapted to communicate a signal to the vehicle operator or to a remote monitoring station or data retrieval device indicating the integrity of the lubricant and/or % RUL as discussed in the previous embodiments. Also, the signal may be optimized for measuring voltammetry and conductivity as discussed in the previous embodiment.

In a presently preferred embodiment, electrode 378a is about 25 mm in length (longitudinally along substrate 392) and consists of about 60 pairs of about 100 micron lines made from nickel. Each alternating line segment is about 4 mm long. Axial gaps of about 100 microns each are formed between adjacent, alternating line segments. Electrode 378b is about 25 mm in length and consists of about 40 pairs of 150 micron lines made from nickel. The segments are 4 mm long and the axial gaps are about 150 microns. Substrate 392 is about 30 mm long and about 5 mm wide. Traces 395 and side rails 394 are about 0.50 mm in width. Contact points 391a, 391b, 391c, and 391d have a diameter of about 0.5 mm. Preferably, protective pads having a diameter of about 0.85 mm surround each contact point. It is preferable to provide maximum spacing between the contact points and surrounding pads.

Naturally, those skilled in the art will readily appreciate that the ideal size, arrangement and/or dimensions discussed in the above embodiment may vary depending upon the application and environment in which the sensor is employed, without departing from the concepts disclosed herein. For example, electrodes 378a, 378b may alternatively consist of a longitudinally arranged array of electrically conductive lines, thus providing a plurality of axial gaps between adjacent, alternating line segments along the latitudinal axis of substrate 392.

Although the in-hub lubricant condition monitoring system of the subject invention has been described with respect to preferred embodiments, those skilled in the art will readily appreciate that changes and modifications may be made thereto without departing from the spirit and scope of the present invention as defined by the appended claims. For example, it is envisioned the type of sensor employed in the system can vary from those which are specifically described and illustrated herein, so that other conditions or characteristics of the lubricant could be monitored.

What is claimed is:

1. An apparatus for monitoring the condition of a fluid lubricant contained within a lubricant chamber formed in a wheel hub mounted for rotation about a stationary wheel axle, the apparatus comprising: a) an annular bearing spacer configured for mounting on the wheel axle between axially opposed inboard and outboard bearings, the annular bearing spacer forming an interior lubricant reservoir between an inner surface of the spacer and the wheel axle; b) a guide vane for directing lubricant from the lubricant chamber to the interior lubricant reservoir during rotation of the wheel hub assembly about the wheel axle; and c) a condition sensor operatively associated with the interior lubricant reservoir for determining at least one condition of the lubricant directed into the interior reservoir by the guide vane.

2. An apparatus as recited in claim 1, further comprising means operatively associated with the condition sensor for communicating a signal to a receiver corresponding to a determined condition of the lubricant.

3. An apparatus as recited in claim 1, wherein the annular bearing spacer has at least one inlet port formed therein to facilitate the ingress of lubricant into the interior reservoir from the guide vane.

4. An apparatus as recited in claim 1, wherein the annular bearing spacer has at least one outlet port formed therein to facilitate the egress of lubricant from the interior reservoir into the lubricant chamber of the wheel hub.

5. An apparatus as recited in claim 4, wherein a filtration device is operatively associated with the annular bearing spacer for filtering lubricant transferring from the interior reservoir to the lubricant chamber of the wheel hub.

6. An apparatus as recited in claim 1, wherein the guide vane extends radially outwardly from an outer surface of the annular bearing spacer and is configured to direct lubricant from the lubricant chamber to the interior lubricant reservoir upon rotation of the wheel hub about the wheel axle.

7. An apparatus as recited in claim 6, wherein the guide vane includes fluid passages for receiving lubricant from the lubricant chamber as the wheel hub rotates about the wheel axle and for directing the lubricant radially inwardly toward the interior lubricant chamber.

8. An apparatus as recited in claim 7, wherein the guide vane includes axial discharge ports in communication with the fluid passages for directing lubricant in an axial direction toward the inboard and outboard bearings as the wheel hub rotates about the wheel axle.

9. An apparatus as recited in claim 1, wherein the condition sensor is adapted and configured to sense the presence of metallic particles in the lubricant.

10. An apparatus as recited in claim 1, wherein the condition sensor is adapted and configured to sense antioxidant levels in the lubricant.

11. An apparatus as recited in claim 2, wherein the means operatively associated with the condition sensor for communicating a signal comprises a radio frequency signal generator.

12. An apparatus as recited in claim 1, wherein the condition sensor is adapted and configured to sense conductivity levels in the lubricant.

13. An apparatus as recited in claim 1, wherein the condition sensor is adapted and configured to communicate the remaining useful life of the lubricant.

14. A bearing spacer for a unitized wheel hub and bearing assembly, wherein the wheel hub is supported on a stationary wheel axle by axially opposed inboard and outboard bearings, and wherein the wheel hub defines a lubricant chamber containing lubricant to bathe the bearings, the bearing spacer comprising: a) an annular spacer body configured for mounting over the wheel axle between the inboard and outboard bearings, the annular spacer body forming an interior lubricant reservoir between an inner surface of the spacer body and the wheel axle, the lubricant reservoir having an inlet port and at least one outlet port proximate to one of the bearings; and b) a guide vane extending radially outwardly from an exterior surface of the annular spacer body for directing lubricant from the lubricant chamber to the interior lubricant reservoir during rotation of the wheel hub about the wheel axle.

15. A bearing spacer as recited in claim 14, wherein a filtration device is operatively associated with the annular spacer body for filtering lubricant transferring from the interior reservoir to the lubricant chamber of the wheel hub.

16. A bearing spacer as recited in claim 14, wherein the guide vane includes fluid passages for receiving lubricant from the lubricant chamber as the wheel hub rotates about the wheel axle and for directing the lubricant radially inwardly toward the interior lubricant chamber.

17. A bearing spacer as recited in claim 16, wherein the guide vane includes axial discharge ports in communication with the fluid passages for directing lubricant in an axial direction toward the inboard and outboard bearings as the wheel hub rotates about the wheel axle.

18. A bearing spacer as recited in claim 16, further comprising a sensor operatively associated with the interior lubricant reservoir for determining at least one condition of the lubricant directed into the interior reservoir by the guide vane.

19. An apparatus as recited in claim 18, wherein the sensor is adapted and configured to sense the presence of metallic particles in the lubricant.

20. An apparatus as recited in claim 18, wherein the sensor is adapted and configured to sense antioxidant levels in the lubricant.

21. A bearing spacer as recited in claim 18, wherein means are operatively associated with the sensor for communicating a signal to a receiver corresponding to a determined condition of the lubricant.

22. An apparatus as recited in claim 18, wherein the sensor is adapted and configured to sense conductivity in the lubricant.

23. An apparatus as recited in claim 18, wherein the sensor is adapted and configured to determine the total acid number in the lubricant.

24. An apparatus as recited in claim 18, wherein the sensor is adapted and configured to determine the remaining useful life of the lubricant.

25. A method of monitoring the condition of a fluid lubricant contained within the lubricant chamber of a wheel hub of a vehicle comprising the steps of: a) positioning a lubricant condition sensor within the lubricant chamber of a wheel hub; b) determining a condition of the lubricant within the lubricant chamber of the wheel hub; and c) communicating a signal relating to the condition of the lubricant within the lubricant chamber of the wheel hub.

26. A method of monitoring the condition of a lubricant according to claim 25, wherein the step of determining the condition of the lubricant includes sensing the presence of metallic particles in the lubricant.

27. A method of monitoring the condition of a lubricant according to claim 25, wherein the step of determining the condition of the lubricant includes sensing antioxidant levels in the lubricant.

28. An apparatus for monitoring the condition of a fluid lubricant contained within a lubricant chamber formed in a wheel hub mounted for rotation about a stationary wheel axle, the apparatus comprising:

a) an annular bearing spacer configured for mounting on the wheel axle between axially opposed inboard and outboard bearings, the annular bearing spacer forming an interior lubricant reservoir between an inner surface of the spacer and the wheel axle; and, b) a condition sensor operatively associated with the interior lubricant reservoir for determining at least one condition of the lubricant.

* * * * *